United States Patent [19]

Hay et al.

[11] Patent Number: 5,004,544
[45] Date of Patent: Apr. 2, 1991

[54] REACTION BONDED SILICON NITRIDE FILTRATION MEMBRANES

[75] Inventors: Robert A. Hay, Dudley; Craig A. Willkens, Sterling; Arsenault, Normand P., Holden, all of Mass.

[73] Assignee: Norton Company, Worcester, Mass.

[21] Appl. No.: 434,651

[22] Filed: Nov. 13, 1989

[51] Int. Cl.$^5$ .............................................. B01D 71/02
[52] U.S. Cl. ................................ 210/490; 210/500.25; 427/245
[58] Field of Search ............... 264/43; 210/490, 510.1, 210/496, 500.21, 500.25, 500.26; 427/244, 245, 246

[56] References Cited

U.S. PATENT DOCUMENTS 4,698,157 10/1987 Gillot .................................... 210/496

*Primary Examiner*—Frank Spear
*Attorney, Agent, or Firm*—Arthur A. Loiselle, Jr.

[57] ABSTRACT

Strong and durable silicon nitride filtration membranes with effective separating layers having effective pore diameters less than about 1 micron are produced by depositing a source of silicon onto a porous microfilter support, removing any liquid used in the depositing, and subjecting the silicon source to nitridation conditions. Suitable sources of silicon include silicon per se and silica. When silica is used, a suitable reducing agent is deposited therewith to reduce the silica to silicon in situ.

23 Claims, No Drawings

REACTION BONDED SILICON NITRIDE FILTRATION MEMBRANES

TECHNICAL FIELD

This invention relates to the field of supported filtration membranes, particularly microfiltration and ultrafiltration membranes having effective pore sizes of 10 to 0.1 microns and 0.1 to 0.001 microns, respectively. More particularly, the invention relates to fine supported filtration membranes, i.e. those having effective pore sizes of about 100 nm or less. This invention further provides a method of reproducibly manufacturing ceramic filtration membranes of specific pore sizes.

Microfiltration and ultrafiltration membranes, as is known in the art, may be used as filters, selective diffusion, or effusion barriers, osmosis or electrophoresis membranes, zones for controlled reactions between gas and liquid phases, etc. The membranes may be used unsupported, but more often they are backed by much stronger and thicker supporting membranes with substantially larger pore sizes, so that the supporting membrane contributes mechanical support without significantly restricting the flow of materials through the membrane. A convenient and frequently used support is a microfilter having larger pores than the separation membrane attached thereto. Generally microfilter supports having average pore sizes between about 100 and 5000 nm are used.

For supported filtration membranes, or for any type of filter or membrane having two or more layers with different pore sizes, the layer with the finest pore size controls the separation effectiveness of the total assembly of membrane plus support and is denoted herein as the "effective separating layer" or "ESL".

TECHNICAL BACKGROUND

Ceramic membranes prepared from oxide ceramics have been known for several years. In comparison to polymeric membranes, ceramic membranes have much higher temperature capabilities (e.g. alumina can be used up to about 800° C.). They are also highly inert chemically. They can be repeatedly sterilized at 120° C. or higher. Since the creation of the first ceramic membranes, the interest in using them at more and more severe conditions, i.e. at higher operating temperatures and at more extreme pH's, has increased. However, the inherent physical limitations of the oxide ceramics together with the difficulty in reproducibly manufacturing ceramic membranes has limited their utility. The present invention produces ceramic membranes which are generally more stable at extreme conditions than previous ceramic membranes. This invention also enables the manufacture of ceramic membranes to be performed quite reproducibly.

U.S. Pat. No. 4,698,157 discloses supported filter membranes prepared from silicon nitride particles which are then sintered to fixedly interconnect them. As in any process relying solely upon heating for an extended time to cause a reproducible physical action, there is a great degree of non-reproducibity inherently created. Thus, slight variations in the heating temperature and/or time can cause wide variation in the pore sizes produced in the final product.

U.K. Pat. No. 1,490,543 discloses preparing unsupported porous silicon nitride materials by the nitridation of a composition of a silicon powder, a binder powder, and an inert removable additive powder. The porosity of the material is stated to be generated by the removal of the additive powder. The resultant bodies have total porosities of 50% or more. The fine pores required of a microfilter or an ultrafilter are not obtainable by this procedure. Also the thicknesses of the resultant bodies would create excessive pressure drops across them during actual use thereby effectively precluding use in the fine separations to which the present invention is directed.

SUMMARY OF THE INVENTION

Supported ultrafiltration and microfiltration membranes in which the ESL consists essentially of reaction bonded silicon nitride can be obtained by (a) depositing a thin layer of a source of silicon from a solution onto a filter support, (b) drying the deposited layer and support, and (c) subjecting the dried layer and support to a nitrogen or ammonia atmosphere at a temperature and for a sufficient time to convert the source of silicon to reaction bonded silicon nitride. In this context, "consisting essentially of reaction bonded silicon nitride" means that the ESL is at least ninety (90) volume percent silicon nitride and is formed in situ. The resultant ESL should have a substantially similar resistance to chemical attack as characterizes commercially pure silicon nitride.

DESCRIPTION OF THE PREFERRED EMBODIMENTS

The preferred supports for the fine filters of this invention are substantially 100% alpha alumina tube microfilters available from Norton Company, Worcester, Mass., under the trademark CERAFLO. The tubes are available in average pore sizes ranging from about 0.2 microns to about 5 microns or more, with the ESL on either the inside or outside of the tube. Of course, the pores of the support must be larger than the pores of the silicon nitride ESL placed thereon in accordance with this invention.

Silicon powder sources useful for making the membranes of this invention include both silicon metal powder per se and silicon dioxide (silica) powder. When silica powders are used, a reducing agent must also be present so that the silica can be converted to silicon metal in situ, in a known manner. The silicon source materials should be used in a highly pure form, as is known. Such powders are available in varying degrees of purity based primarily upon the iron content. Thus, standard grades generally contain about 0.4–0.8% iron, while pure grades generally contain less than 0.1%, and superpure grades contain iron only in parts per million. While all of these grades may be used in the invention, the pure and superpure grades are preferred.

The specific average particle size of the silicon or silica powders and the uniformity thereof are both directly related to the size of the pores produced herein. To produce extremely fine pore membranes, one must start with an extremely fine silicon powder source. Thus powders used will generally have average particle sizes of less than about 3 microns, preferably less than about 1.5 microns, and most preferably less than about 0.75 microns. Preferably, these sizes are obtained by conventional milling of larger such particles followed by conventional classification thereof. While normally the powders will be essentially mono-disperse in particle size to produce a highly uniform silicon nitride membrane, mixtures of different particle sizes may also be used herein.

When silicon dioxide powders are used as the source of silicon, a reducing agent must also be provided in intimate mixture therewith. The most common reducing agent useful herein is carbon, generally as fine carbon black particles, which will cause the carbothermal reduction of the silica powders to silicon metal in situ. The carbon black particles are readily obtainable commercially in the desired nanometer size range. Alternatively and as shown below, silicon metal powder may be used as the reducing agent in place of the carbon, in which case there is no need for a subsequent carbon burnout step.

Optionally but preferably about 0.1 to about 30 weight % silicon nitride seed particles, based on the total weight of the silicon and/or silica present, are added. The presence of the seeds in the source of silicon has been found to increase the silicon nitride content of the resultant membrane which could be particularly beneficial under some especially severe environments.

To provide a layer of a source of silicon on a support, it is most convenient to form a slip of the silicon source in a suitable liquid, preferably with the aid of a dispersing agent as is known to the art. Slips containing less than about 5 weight % solids, preferably less than about 3 %, are generally suitable. To actually deposit the silicon layer, the slip may be simply passed briefly over the support surface being coated since the contact is generally sufficient to cause a thin and reasonably uniform layer of the slip to remain on the support surface. A preferred deposition procedure for use in coating the interior surfaces of support tubes, is to draw the slip into the tube by means of a partial vacuum and then reduce the vacuum so that the excess slip flows out.

The thickness of the layer deposited on the support may be controlled by both the solids content and the slip contact time with the support, as is generally known. The thickness of the filtering layer eventually formed is generally close to that of the silicon layer from which it is formed. The preparation of the thin highly uniform layers is often improved by the use of one or more dispersants and/or binders, as is known. Layers of silicon or silica as thick as about 25–30 microns can be readily deposited onto porous supports. Preferably, the layer thickness is about 2 to 10 microns to minimize the pressure drop across the resultant membrane during use.

When a silicon metal powder per se is used, it normally is dispersed in a short chain aliphatic alcohol such as ethanol, propanol, isopropanol, and the like, along with suitable dispersants. For combinations of silica powders and reducing agents, aqueous dispersions along with suitable dispersants may be used. Examples of such dispersants include polycarboxylate amine salts, salts of condensed napthalene sulfonic acid, mercaptopropyltrimethoxysilane, and the like The dispersants are generally used in amounts ranging up to about 5, preferably up to about 3, weight %. To increase the uniformity of the thin silicon source layer it has also at times been found helpful to provide a means for the layer to gel onto the support. With silicon metal powders, for example, this can be accomplished by using one or more organic binders such as polyethylene glycol, polyethylene oxide, or polyacrylic acid polymers in an amount of about 1 to 5, preferably about 1.5 to 3.5, weight %. With silica powders, the slip can be prepared at the point of incipient gelation due to the silica concentration. For silicon metal, the slip compositions are generally deposited at an elevated temperature with gelation and deposition occuring as the slip cools on the support.

Once the silicon source layer is deposited on the support, it will then be subjected to conventional nitridation reactions by exposure to a nitrogen-containing atmosphere at high temperatures. Before this is done all liquids present in the coated support need to be removed. While room temperature drying is usually preferred and may generally be accomplished within 24 hours, elevated temperatures may also be used. The silicon source layer is then converted to a layer of silicon nitride by reaction with nitrogen at elevated temperature in a known manner. The direct nitridation of silicon and the carbothermal reductive nitridation of silica are both well known reactions. The use of the silicon metal in a reductive nitridation of silica is believed new. It proceeds in an essentially similar manner to the conventional carbothermal reduction process.

In each of the cases, nitrogen or ammonia gas with or without non-reactive gas components such as argon, helium, hydrogen, and the like, is brought into contact with the silicon source layer so that the silicon is converted to silicon nitride in a vapor phase reaction which may be performed in either a flowing atmosphere or a quasi-static atmosphere at a predetermined pressure. The temperature of and gas flow to the exothermic reaction are normally controlled by maintaining the chamber pressure between two fixed limits. Further details regarding nitridation reaction parameters may be found in such as U.S. Pat. Nos. 3,937,792 and 4,127,630, as well as U.S. Ser. No. S.N. 06/893,747, filed Aug. 6, 1986, N.D. Corbin et al., and the article by J. A. Mangels, "Effect of Rate-Controlled Nitriding and Nitriding Atmospheres on the Formation of Reaction-Bonded $Si_3N_4$," Ceramic Bulletin, Vol. 60, No. 6 (1981) p 613, the disclosures of which are incorporated herein by reference. In view of the very thin layers of silicon being nitrided, the usual degree, of reaction control to prevent exotherming has not been found necessary and relatively short nitriding cycles may be used.

The in situ conversion to silicon nitride is continued until substantial completion by which time the silicon source layer has become a silicon nitride ESL membrane having a uniform pore size. The specific pore size which results is dependent upon the particle size of the initial silicon metal and/or silica particles and not upon the much less reproducible processing conditions as is the case for alpha-alumina membranes.

If desired an intermediate layer having somewhat larger pores than that of the desired silicon nitride ESL may be applied according to methods taught in French Patent 2,502,508, the disclosure of which is incorporated herein by reference.

The practice of this invention may be illustrated by the following examples in which all parts and percents are by weight unless otherwise specified.

EXAMPLE 1

A slip is prepared by dispersing 2.5% silicon metal powder having an average particle size of 1 micron and a surface area of about 12 square meters/gram in ethanol. The slip is used to coat a 20–25 cm long cylindrical microfiltration tube having a 3 mm inside diameter and 5 mm outside diameter. The tube, commercially available under the tradename CERAFLO from Norton Company, Worcester, Mass., has an initial ESL with an average pore size of about 200 nm.

The slip described above is drawn up into the precoated tube and then allowed to drain out as soon as it reaches the top. This operation, which requires about two seconds, produces a silicon metal layer about 5-10 microns thick. Even though the top of the tube is exposed for less time than the bottom, the layer is fairly uniform over the entire length of the tube because the thickness has been found to depend primarily on the extent to which the slip penetrates the tube by capillary action, not on any time dependent settling rate such as might control the thickness on a horizontal surface.

The tube with its deposited silicon metal layer is dried at room temperature overnight. The entire tube is then subjected to nitridation at a maximum temperature of 1400° C. for 8 hours to convert the silicon metal layer to a silicon nitride membrane. The nitridation reaction is accompanied by a volume increase due to the addition of four nitrogen atoms to every three silicon atoms. This volume increase causes the average pore size of the silicon nitride membrane to be smaller than that of the silicon metal from which it is formed. determined by mercury porosimetry. The membrane produced has an ESL 5-10 microns thick having an average pore size of 0.1-1.0 micron (100-1000 nm), a total porosity of about 35%, and consisting essentially of reaction bonded silicon nitride.

EXAMPLE 2

The procedure of Example 1 is repeated after application of the silicon metal slip. In this example, this layer is prepared of milled high purity silicon metal particles having particle sizes less than 0.5 micron and a surface area of about 50 m$^2$/g. The slip is coated onto the tube and nitrided as in Example 1. The resulting product has the same characteristics as that of Example 1, except that the ESL thickness is about 5 microns and exhibits an average pore size of 0.01-0.1 microns (10-100 nm).

EXAMPLE 3

The procedure of Example 1 is repeated except that (i) the ethanol-silicon metal slip is replaced by an aqueous solution containing a 1.0% suspension of silicon dioxide and carbon black at a pH of 9-10 to stabilize the silica and 2% of Tamol SN as a dispersion aid to stabilize the carbon black. The silica and carbon black are used in a 1:1 weight ratio to each other. The slip is coated onto the tube as in Example 1 resulting in a 1-5 micron thick layer. The coated tube is dried for 24 hours at 25° C. and then subjected to reaction bonding in a nitrogen atmosphere. The tube is then fired at about 750° C. for 3 hours to remove any excess carbon black. The resultant final membrane is greater than 90% silicon nitride and has an average pore size of less than 0.1 micron (<100 nm).

EXAMPLE 4

The procedure of Example 3 is repeated except that the aqueous slip further contains 20% alpha silicon nitride seeds to assist in the carbothermal nitridation reaction. The resultant final membrane is greater than 99.5% silicon nitride and has an average pore size of less than 0.1 micron (<100 nm)

EXAMPLE 5

The procedure of Example 3 is repeated except that the carbon black in the aqueous slip is replaced by silicon metal particles. The slip thus contains 1% solids (silica plus silicon metal) in a 1:5 weight ratio at a pH of 9-10 to stabilize the silica. The silica particles have an average particle size of 20 nm. and an average surface area of about 200 m$^2$/g. The silicon metal particles have an average particle size of 0.5 microns and an average surface area of 25 m$^2$/g. A 1 to 5 micron thick silica/silicon layer is deposited on the microfilter tube and is subjected to nitridation. The resultant membrane is found to be essentially 100% silicon nitride as determined by x-ray diffraction and it has an average pore size of less than 0.1 micron (<100 nm).

What is claimed is:

1. A supported filtration membrane comprising an effective separating layer consisting essentially of in situ formed silicon nitride having an effective pore diameter of about 1,000 nm or less and bonded to a porous support having substantially greater permeability than said effective separating layer.

2. The supported membrane of claim 1 wherein the porous support is in the form of a tube.

3. The supported membrane of claim 2 wherein said tube has a plurality of layers with different pore sizes arranged so that a material passing through the wall of the tube will pass through each of said layers.

4. The supported membrane of claim 3 wherein said tube has its finest pore layer on the inside of the tube.

5. The supported membrane of claim 3 wherein said tube has an effective pore diameter of about 100 to 300 nm in its finest pore layer.

6. The supported membrane of claim 3 wherein the effective separation layer has an effective pore diameter of about 1 to about 100 nm.

7. The supported membrane of claim 1 wherein the effective separation layer has an effective pore diameter of about 1 to about 100 nm.

8. The supported membrane of claim 1 wherein the effective separation layer has a thickness of about 1 to about 30 microns.

9. A process for manufacturing a supported silicon nitride filtration membrane having an effective separating layer bonded to a porous support, said process comprising:
   (a) coating a porous support with a solution comprising substantially uniformly sized particles of a source of silicon to form an about 1-30 micron thick layer of the source of silicon;
   (b) drying said layer and support; and
   (c) heating the dried layer and support at a sufficiently high temperature and for a sufficient time in an atmosphere comprising a gas selected from the group consisting of nitrogen and ammonia (i) to convert the dried layer to substantially silicon nitride and (ii) to bond it to the support.

10. The process of claim 9 wherein the support consists essentially of microporous polycrystalline alpha alumina.

11. The process of claim 9 wherein the source of silicon is silicon metal particles.

12. The process of claim 11 wherein the solution is an alcoholic solution.

13. The process of claim 12 wherein the alcoholic solution comprises an alcohol selected from the group consisting essentially of ethanol, propanol, and isopropanol.

14. The process of claim 9 wherein the source of silicon is silicon dioxide particles and the solution further contains a reducing agent.

15. The process of claim 14 wherein the reducing agent is fine particulate carbon.

16. The process of claim 15 wherein after the nitriding of (c), the nitrided layer and support are fired to remove any remaining fine particulate carbon.

17. The process of claim 14 wherein the reducing agent is silicon metal particles.

18. The process of claim 14 wherein the solution is an aqueous solution.

19. The process of claim 9 wherein the particles of the source of silicon have an average particle size of less than about 3 microns.

20. The process of claim 9 wherein the particles of the source of silicon have an average particle size of about 1 micron or less.

21. The process of claim 9 wherein the source of silicon solution further contains about 0.1 to about 30 wt % of silicon nitride seed particles, based on the total weight of the source of silicon.

22. The process of claim 21 wherein said seed particles are at least 80 wt % alpha silicon nitride.

23. The process of claim 22 wherein said alpha silicon nitride seed particles are present in an amount of at least 0.05 wt of the weight of the source of silicon used to prepare the solution.

* * * * *

UNITED STATES PATENT AND TRADEMARK OFFICE
CERTIFICATE OF CORRECTION

PATENT NO. : 5,004,544

DATED : April 2, 1991

INVENTOR(S) : Robert A. Hay et al

It is certified that error appears in the above-identified patent and that said Letters Patent is hereby corrected as shown below:

Column 5 line 21 insert --The pore size of the silicon nitride filtration membrane is-- before "determined".

Column 8 line 12 insert --%-- after "wt".

Signed and Sealed this

Twenty-fifth Day of August, 1992

Attest:

DOUGLAS B. COMER

Attesting Officer

Acting Commissioner of Patents and Trademarks